United States Patent [19]

Crossman et al.

[11] Patent Number: 5,317,672

[45] Date of Patent: May 31, 1994

[54] VARIABLE BIT RATE SPEECH ENCODER

[75] Inventors: Antony H. Crossman, Swampscott; Edmund S. Thompson, Burlington, both of Mass.

[73] Assignee: Picturetel Corporation, Danvers, Mass.

[21] Appl. No.: 847,710

[22] Filed: Mar. 4, 1992

Related U.S. Application Data

[63] Continuation-in-part of Ser. No. 665,948, Mar. 6, 1991, abandoned, which is a continuation of Ser. No. 664,579, Mar. 5, 1991, abandoned.

[51] Int. Cl.$^5$ .............................................. G10L 9/00
[52] U.S. Cl. ........................................................ 395/238
[58] Field of Search ................................. 381/31–37, 381/29–47; 395/2.38

[56] References Cited

U.S. PATENT DOCUMENTS

| | | | |
|---|---|---|---|
| 4,538,234 | 8/1985 | Honda et al. | 381/31 |
| 4,696,040 | 9/1987 | Doddington et al. | 381/46 |
| 4,751,736 | 6/1988 | Gupta et al. | 381/31 |
| 4,949,383 | 8/1990 | Koh et al. | 381/31 |
| 4,964,166 | 10/1990 | Wilson | 381/34 |
| 4,965,830 | 10/1990 | Barham et al. | 381/31 |
| 4,991,213 | 2/1991 | Wilson | 381/34 |
| 5,040,217 | 8/1991 | Brandenburg et al. | 381/47 |
| 5,042,069 | 8/1991 | Chhatwal et al. | 381/31 |

OTHER PUBLICATIONS

Huang et al, "Block Quantization of Correlated Gaussian Random Variables", IEEE Transactions on Communications Systems, Sep. 1963, pp. 289–296.
Tribolet et al, "Frequency Domain Coding of Speech", IEEE Transactions on Acoustics, vol. ASSP-27, No. 5, 1979, pp. 512–530.
Atal et al, "Predictive Coding of Speech Signals and Subjective Error Criteria", IEEE Transactions on Acoustics, 1979, vol. ASSP-27, pp. 247–254.
Zelinski et al, "Adaptive Transform Coding of Speech Signals", IEEE Transactions on Acoustics, vol. ASSP-25, 1977, pp. 299–309.
Max, "Quantizing for Minimum Distortion", IRE Transactions on Information Theory, Mar. 1960, pp. 7–12.
Darragh, "Subband and Transform Coding of Images", May, 1989, Dissertation of John Darragh, U.C.L.A. Dept. of Electrical Engineering, Report No. UCLA--ENG-89-53 pp. 1–165.

Primary Examiner—Michael R. Fleming
Assistant Examiner—Michelle Doerrler
Attorney, Agent, or Firm—Fish & Richardson

[57] ABSTRACT

A method and apparatus for allocating transmission bits for use in transmitting samples of a digital signal. An aggregate allowable quantization distortion value is selected representing an allowable quantization distortion error for a frame of samples of the digital signal. A set of samples are selected from the frame of samples such that a plurality of the selected samples are greater than a noise threshold. For each sample of the set, a sample quantization distortion value is computed which represents an allowable quantization distortion error for the sample. The sum of all sample quantization distortion values is approximately equal to the aggregate allowable quantization distortion value. For each sample of the set, a quantization step size is selected which yields a quantization distortion error approximately equal to the sample's corresponding quantization distortion value. Each sample is then quantized using its quantization step size. An estimation signal is prepared which is representative of the digital signal but has fewer samples than the digital signal. A signal index is prepared which represents, for at least one sample of the estimation signal, the magnitude of a signal component relative to the magnitude of a noise component. Based on the signal index, samples of the digital signal are selected which have a sufficiently large signal component. The selected samples of the digital signal and the samples of the digital estimation signal are both transmitted to a remote device. The remote device reconstructs the digital signal from the transmitted selected samples and estimation samples.

22 Claims, 14 Drawing Sheets

VARIABLE BIT RATE SPEECH ENCODER

This is a continuation in part of U.S. application Ser. No. 07/665,948 filed Mar. 6, 1991 now abandoned which is a continuation of U.S. application Ser. No. 07/664,579, filed Mar. 5, 1991 now abandoned.

BACKGROUND OF THE INVENTION

The invention relates generally to communicating voice and video information over a channel having a fixed capacity, such as a telephone communication channel.

Video conferencing systems typically transmit both voice and video information over the same channel. A portion of the channel's bandwidth is typically dedicated to voice information and the remaining bandwidth is allocated to video information.

The amount of video and voice information varies with time. For example, at certain moments in time, a person at one end of the system may be silent. Thus, if the system includes a variable capacity voice encoder, little information needs to be transmitted during such moments of silence.

Similarly, the video signal may have little or no change between frames as, for example, when all objects within the field of view are still. If the system includes a variable capacity video encoder, little information needs to be transmitted during such moments of inactivity. At the other extreme, during times of great activity, the amount of video information may exceed the channel capacity allocated to video information. Accordingly, the system transmits as much video information as possible, discarding the remainder.

Typically, the video encoder accords priority to the most noticeable features of the video signal. Thus, high priority information is transmitted first and the less noticeable low priority information is temporarily discarded if the channel lacks sufficient capacity. Accordingly, it is desirable to have available as much video bandwidth as possible.

It is therefore an object of the present invention to reduce the amount of channel bandwidth allocated to audio information whenever there is little audio information required to be sent. The remaining portion of bandwidth is allocated to video information. Thus, on average, a lower bit rate is provided for audio information and a higher bit rate is provided for video information.

SUMMARY OF THE INVENTION

The invention relates to a method and apparatus for allocating transmission bits for use in transmitting samples of a digital signal. An aggregate allowable quantization distortion value is selected representing an allowable quantization distortion error for a frame of samples of the digital signal. A set of samples are selected from the frame of samples such that a plurality of the selected samples are greater than a noise threshold. For each sample of the set, a sample quantization distortion value is computed which represents an allowable quantization distortion error for the sample. The sum of all sample quantization distortion values is approximately equal to the aggregate allowable quantization distortion value. For each sample of the set, a quantization step size is selected which yields a quantization distortion error approximately equal to the sample's corresponding quantization distortion value. Each sample is then quantized using its quantization step size.

In preferred embodiments, the digital signal includes a noise component and a signal component. A signal index is prepared representing, for at least one sample of the frame, the magnitude of the signal component relative to the magnitude of the noise component. The aggregate allowable quantization distortion is selected based on the signal index.

The sample quantization distortion value is computed by dividing the aggregate allowable quantization distortion value by a number of samples in the frame of samples to form a first sample distortion value. A tentative set of samples of the digital signal is selected wherein each sample of the tentative set is greater than a noise threshold determined at least in part by the value of the first sample distortion value. The first sample distortion value is then adjusted by an amount determined by the difference between the first sample distortion value and at least one sample excluded from the tentative set (i.e, a "noisy sample"). Based on the adjusted distortion value, the process is repeated to identify any noisy samples of the tentative set; remove the noisy samples, if any, from the tentative set; and again adjust the first sample distortion value by an amount determined by the difference between the first sample distortion value and a noisy sample. The process is repeated until an adjusted first sample distortion value is reached for which no additional noisy samples of the tentative set are found or until the process has been repeated a maximum number of times.

After the adjustment is terminated, the number of bits required to transmit all samples of the tentative set is estimated. The estimated bit number is compared to a maximum bit number. If the estimated bit number is less than or equal to the maximum bit number, a final noise threshold is selected based on the adjusted first sample distortion value.

If the estimated bit number exceeds the maximum bit number, a second sample distortion value, is prepared. A second tentative set of samples of the digital signal is then selected wherein each of a plurality of samples of the second tentative set have a magnitude above the second sample distortion value. The number of bits required to transmit all samples of the second tentative set is then estimated. The estimated bit number is compared to the maximum bit number. If it is greater than the maximum bit number, the second sample distortion value is increased and the second tentative set of samples is re-selected based on the adjusted second sample distribution value. The number of bits required to transmit the second tentative set is again estimated. This process is repeated until a second sample distortion value is reached for which the estimated bit number is less than or equal to the maximum bit number.

The sample distortion value is then calculated from the adjusted first sample distortion value and the second sample distortion value. A final set of samples of the digital signal, is selected wherein each of a plurality of samples of the final set have a magnitude above a final threshold determined by the sample's corresponding sample distortion value.

In another aspect, the invention relates to a method and apparatus for communicating a digital signal which includes a noise component and a signal component. An estimation signal is prepared which is representative of the digital signal but has fewer samples than the digital signal. A signal index is prepared which represents, for at least one sample of the estimation signal, the magnitude of the signal component relative to the magnitude of the noise component. Based on the signal index, samples of the digital signal are selected which have a sufficiently large signal component. The selected samples of the digital signal and the samples of the digital estimation signal are both transmitted to a remote device. The remote device reconstructs the digital signal from the transmitted selected samples and estimation samples.

In preferred embodiments, the digital signal is a frequency domain speech signal representative of voice information to be communicated, and each sample of the estimation signal is a spectral estimate of the frequency domain signal in a corresponding band of frequencies. To reconstruct the frequency domain signal, a random number is generated for each nonselected sample of the frequency domain speech signal. A noise estimate of the magnitude of a noise component of the nonselected sample is prepared from at least one spectral estimate. Based on the noise estimate, a scaling factor is generated. The random number is then scaled according to the scaling factor to produce a reconstructed sample representative of the nonselected sample.

The estimation signal and the frequency domain speech signal each include a series of frames. Each frame represents the voice information over a specified window of time. To prepare a first noise estimate for a current frame, an initial noise estimate is first prepared for a prior frame of the estimation signal. The initial noise estimate is prepared from at least one spectral estimate representative of a band of frequencies of the prior frame. Based on the magnitude of the signal index, a rise time constant $t_r$ and a fall time constant $t_f$ are then selected. The selected rise time constant is added to the initial noise estimate to form an upper threshold, and the selected fall time constant is subtracted from the initial noise estimate to form a lower threshold.

A current spectral estimate of the current frame, representative of the same band of frequencies, is then compared to the upper and lower thresholds. If the current spectral estimate is between the thresholds, the current noise estimate is set equal to the current spectral estimate. If it is below the lower threshold, the current noise estimate is set equal to the lower threshold. If the current spectral estimate is above the upper threshold, the current noise estimate is set equal to the upper threshold.

To generate the scaling factor, a noise coefficient and a voice coefficient are first selected based on the value of the signal index. The current noise estimate is then multiplied by the noise index. Similarly, the current spectral estimate is multiplied by the signal index. The products of the multiplication are added together and the scaling factor is then formed from the sum.

In another aspect, the invention relates to a method and apparatus for estimating the energy of a voice component in each of a sequence of frames of a digital signal. A first frame noise estimate is prepared which is representative of the noise energy in a first frequency band of the first frame. A signal energy value is also prepared which is representative of the energy of the digital signal in the first frequency band of a second frame. If the signal energy value is greater than the first frame noise estimate, a small increment value is added to the first frame noise estimate to form a second frame noise estimate. If the energy value is less than the first frame noise estimate, a large decrement value is subtracted from the first frame noise estimate to form the second frame noise estimate. The second frame noise estimate is subtracted from the signal energy value in the first band to form a voice estimate representative of the energy of the voice component in the first frequency band of the second frame.

Other objects, features and advantages of the invention are apparent from the following description of particular preferred embodiments taken together with the drawings.

DESCRIPTION OF A PREFERRED EMBODIMENT

System Overview

Figure 1A:
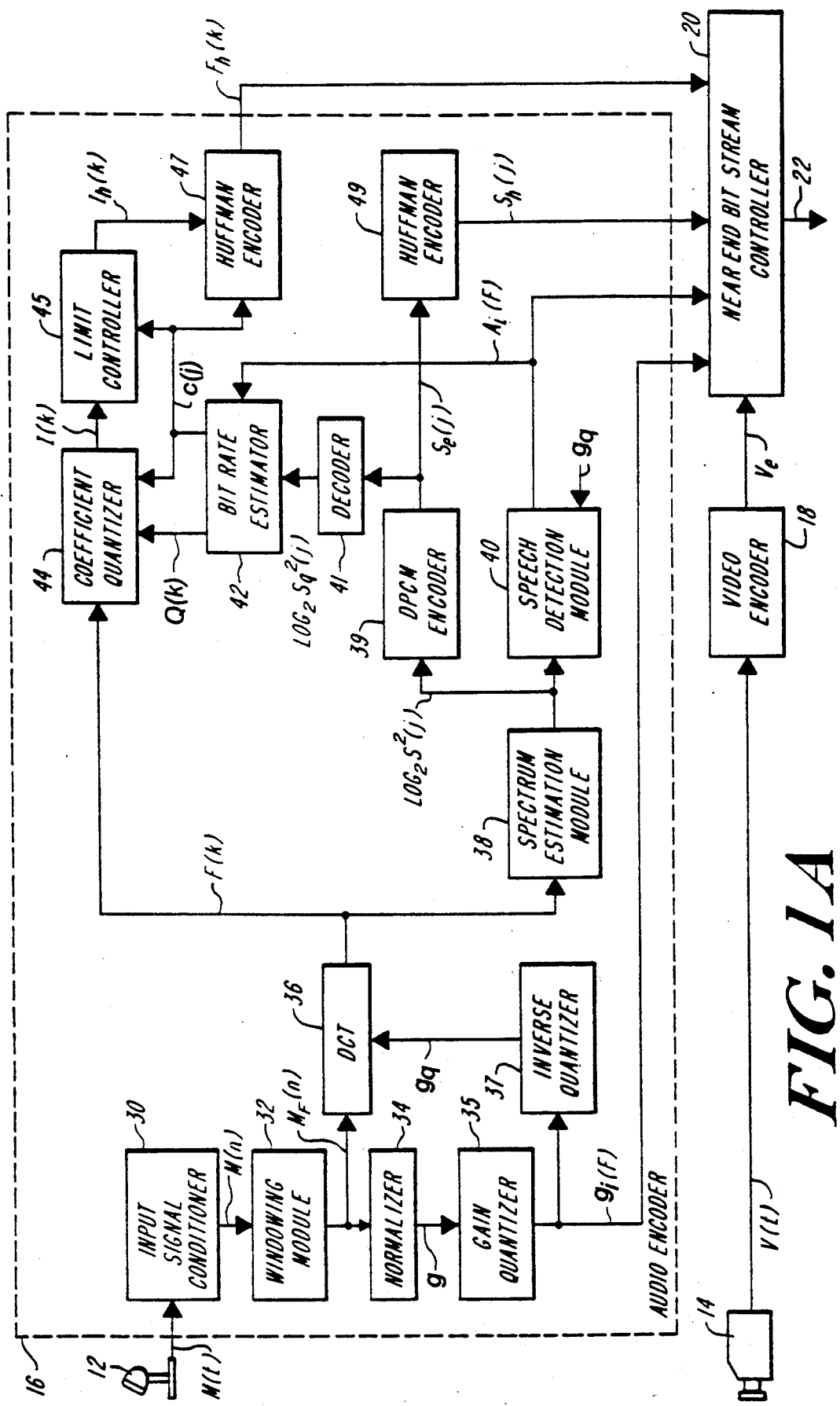
FIG. 1(a) is a block diagram of the near end of a video conferencing system.
Figure 1B:
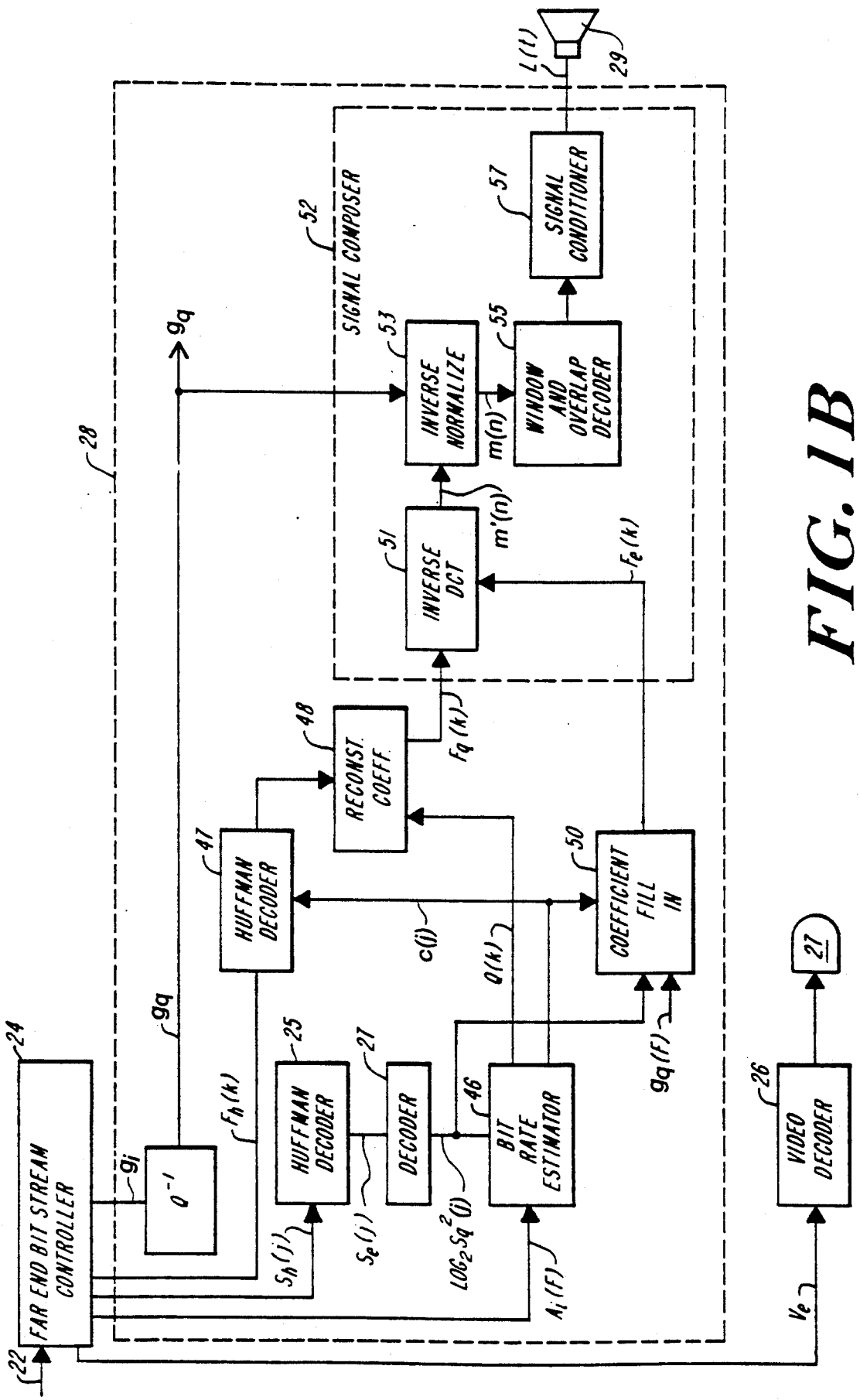
FIG. 1(b) is a block diagram of a far end of a video conferencing system.

Referring to FIGS. 1(a), and 1(b), a video conferencing system includes a near end microphone 12 which receives the voice of a person speaking at the near end and generates an electronic microphone signal m(t) representative of the voice, where t is a variable representing time. Similarly, a camera 14 is focused on the person speaking to generate video signal v(t) representative of the image of the person.

The microphone signal is applied to an audio encoder 16 which digitizes and encodes the microphone signal m(t). As will be explained more fully below, the encoder 16 generates a set of digitally encoded signals $F_h(k)$, $S_h(j)$, $g_i(F)$ and $A_i(F)$ which collectively represent the microphone signal, where, as explained more fully below, k and j are integers representing values of frequency, and F is an integer identifying a "frame" of the microphone signal. Similarly, the video signal v(t) is applied to a video encoder 18 which digitizes and encodes the video signal.

The encoded video signal $V_e$ and the encoded set of microphone signals are applied to a bit stream controller 20 which merges the signals into a serial bit stream for transmission over a communication channel 22.

Referring to FIG. 1(b), a bit stream controller 24 at the far end receives the bit stream from communication channel 22 and separates it into the video and audio components. The received video signal $V_e$ is decoded by a video decoder 26 and applied to a display device 27 to recreate a representation of the near end camera image. At the same time, an audio decoder 28 decodes the set of received microphone signals to generate a loudspeaker signal L(t) representative of the near end microphone signal m(t). In response to the loudspeaker signal, a loudspeaker 29 reproduces the near end voice.

Referring to FIG. 1(a), encoder 16 includes an input signal conditioner 30 for digitizing and filtering the microphone signal m(t) to produce a digitized microphone signal m(n), where n is an integer representing a moment in time. The digitized microphone signal, m(n), is provided to a windowing module 32 which separates m(n) into groups $m_F(n)$, in the illustrated embodiment, of 512 consecutive samples referred to as a frame. The frames are selected to overlap. More specifically, each frame includes the last 16 samples from the previous group and 496 new samples.

Each frame of samples is then applied to a normalization module 34 which calculates the average energy $E_{av}$ of all microphone samples in the frame:

$$E_{av} = \sum_{n=0}^{511} \frac{m^2(n)}{512} \quad (1)$$

It then computes a normalizing gain g(F), for each frame F, equal to the square root of the frame's average energy $E_{av}$:

$$g(F) = \sqrt{E_{av}} \quad (2)$$

As explained more fully below, the normalizing gain g is used at the near end to scale the microphone samples in each frame. At the far end, the normalizing gain is used to restore the decoded microphone samples to their original scale. Accordingly, the same gain used to scale the samples at the near end must be transmitted to the far end for use in rescaling the microphone signal. Since the normalization gain g calculated by module 34 has a relatively large number of bits, normalization module 34 supplies the gain g to a quantizer 35 which generates a gain quantization index $g_i$ which represents the gain using fewer bits than the number of bits specifying gain g. The gain quantization index $g_i$ is then provided to bit steam controller 20 for transmission to the far end.

The far end audio decoder 28 reconstructs the gain from the transmitted gain quantization index $g_i$ and uses the reconstructed gain $g_q$ to restore the microphone signal to its original scale. Since the reconstructed gain $g_q$ typically differs slightly from the original gain g, audio encoder 16 at the near end normalizes the microphone signal using the same gain $g_q$ as used at the far end. More specifically, an inverse quantizer 37 reconstructs the gain $g_q$ from the gain quantization index $g_i$ in the same manner as the far end audio decoder 28.

The quantized gain $g_q$ and the frame of microphone signals $m_F(n)$ are forwarded to a discrete cosine transform module (DCT) 36 which divides each microphone sample $m_F(n)$ by the gain $g_q$ to yield a normalized sample m'(n). It then converts the group of normalized microphone signals m'(n) to the frequency domain using the well known discrete cosine transform algorithm.

DCT 36 thus generates 512 frequency coefficients F(k) representing samples of the frame's frequency spectrum, where k is an integer representing a discrete frequency in the frame's spectrum.

The frequency coefficients F(k) are encoded (using an entropy adaptive transfer coder described below) and transmitted to the far end. To reduce the number of bits necessary to transmit these coefficients, the encoder 16 estimates the relative amounts of signal (e.g., voice) and noise in various regions of the frequency spectrum, and chooses not to transmit coefficients for frequency bands having a relatively large amount of noise. Further, for each coefficient selected for transmission, encoder 16 selects the number of bits required to represent the coefficient based on the amount of noise present in the frequency band which includes the coefficient's frequency. More specifically, it is known that humans can tolerate more corrupting noise in regions of the audio spectrum having relatively large amounts of audio signal, because the audio signal tends to mask the noise. Accordingly, encoder 16 coarsely quantizes coefficients having relatively large amounts of audio signal since the audio signal masks the quantization distortion introduced through the coarse quantization. Thus, the encoder minimizes the number of bits needed to represent each coefficient by selecting a quantization step size tailored to the amount of audio signal represented by the coefficient.

To estimate the relative amounts of noise and signal in various regions of the spectrum, the frequency coefficients F(k) are first supplied to a spectrum estimation module 38. As will be explained more fully below, estimation module 38 reduces the frequency coefficients F(k) to a smaller set of spectral estimates S(j) which represent the frequency spectrum of the frame with less detail, wherein j an integer representing a band of frequencies in the spectrum. A speech detection module 40 processes the spectral estimates of each frame to estimate the energy component of the microphone signal due to noise in the near end room. It then provides a signal index $A_i(F)$ for each frame F which approximates the percentage of the microphone signal in the frame which is attributable to voice information.

For each frame F, the signal index $A_i(F)$ and the spectral estimates S(j) are both used in quantizing and encoding the frequency coefficients F(k) for transmission to the far end. Accordingly, they are both needed at the far end for use in reconstructing the frequency coefficients. The signal index $A_i(F)$ has only three bits and accordingly is applied directly to the bit stream controller 20 for transmission. The spectral estimates S(j) however are converted to logarithmic spectral estimates $\log_2 S^2(j)$ and are encoded using a well known differential pulse code modulation encoder (herein "DPCM") 39 to reduce the number of bits to be transmitted. (The DPCM is preferably a first order DPCM with a unity gain predictor coefficient.) The encoded logarithmic spectral estimates $S_e(j)$ are further encoded using a Huffman encoder 49 to further reduce the number of bits to be transmitted. The resultant Huffman codes $S_h(j)$ are provided to bit stream controller 20 for transmission.

Far end audio decoder 28 reconstructs the logarithmic spectral estimates $\log_2 S^2(j)$ from the Huffman codes $S_h(j)$. However, due to the operation of the DPCM encoder 39, the reconstructed spectral estimates $\log_2 S_q^2(j)$ are not identical to the original estimates Log$_2$ S$^2$(j). Accordingly, a decoder 41 in near end encoder 16 decodes the encoded estimates S$_e$(j) in the same manner as performed at the far end, and uses the thus decoded estimates Log$_2$ S$_q^2$(j) in quantizing and encoding the frequency coefficients F(k). Thus, (as explained more fully below) the audio encoder 16 encodes the frequency coefficients using the identical estimates Log$_2$ S$_q^2$(j) as used by the far end audio decoder 28 in reconstructing the signal Log$_2$ S$_q^2$(j) at the far end.

Based on the values of the decoded spectral estimates Log$_2$ S$_q^2$(j) and the signal index A$_i$(F), a bit rate estimator 42 selects groups of frequency coefficients F(k) which collectively have a sufficient amount of voice information to merit being transmitted to the far end. Next, the bit rate estimator selects for each coefficient to be transmitted, a quantization step size which determines the number of bits to be used in quantizing the coefficients for transmission. For each selected group of frequency coefficients, bit rate estimator 42 first computes a group quantization step size Q(j) and a "class" C(j) (to be described below) for each frequency band j. The group quantization step sizes are then interpolated to yield a coefficient quantization step size Q(k) for each frequency coefficient F(k). Q(k) is then applied to a coefficient quantizer 44 which, based on the assigned step size, quantizes each frequency coefficient in the band to provide a corresponding quantization index I(k).

In response to each quantization index I(k), a limit controller 45 generates a Huffman index I$_h$(k). The Huffman indices I$_h$(k) provided by the limit controller are further encoded by Huffman encoder 47 to yield Huffman codes F$_h$(k). The Huffman codes are applied to bit stream controller 20 for transmission over communication channel 22.

The limit controller begins the above described encoding process starting with the low frequency quantization indices (i.e., k=0) and continuing until all indices are encoded or until the limit controller 45 concludes that the number of encoded bits exceeds the capacity of channel 22 allocated to the microphone signal. If the limit controller 45 concludes that the capacity has been exceeded, it discards the remaining indices I$_h$(k) and provides a unique Huffman index I$_h$(k) indicating that the frame's remaining frequency coefficients will not be coded for transmission. (As explained more fully below, the far end decoder estimates the uncoded coefficients from the transmitted spectral estimates).

Spectrum Estimator for Calculating Spectral Estimates S(j)

Figure 2A:
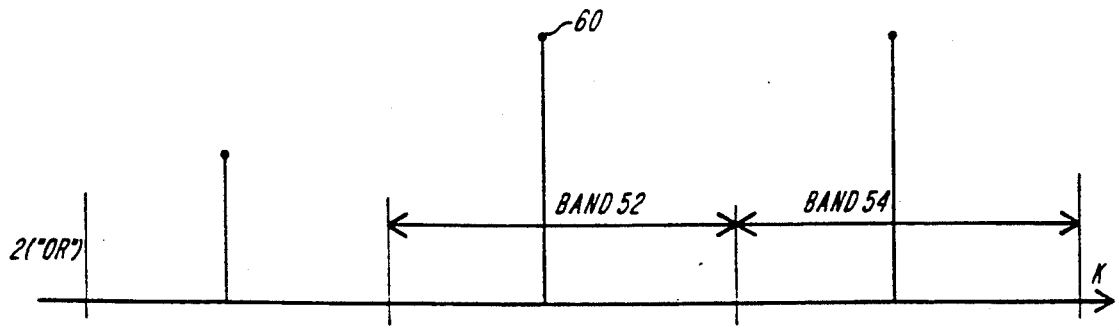
FIGS. 2(a–c) are diagrams of a set of frequency coefficients and two types of estimates of the frequency coefficients.
Figure 2B:
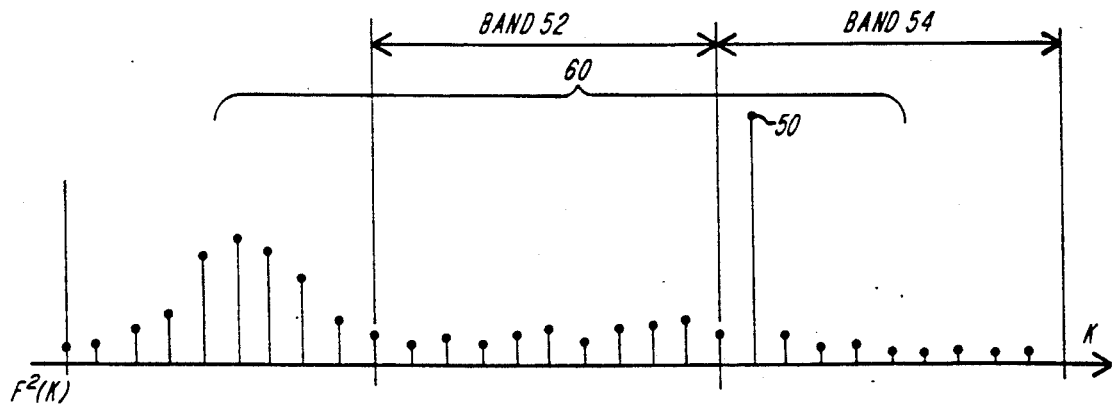
Figure 2C:
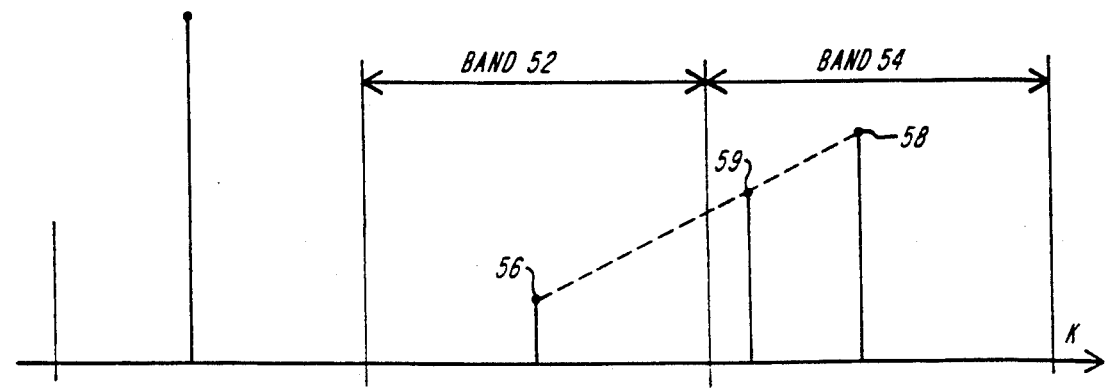
Figure 3A:
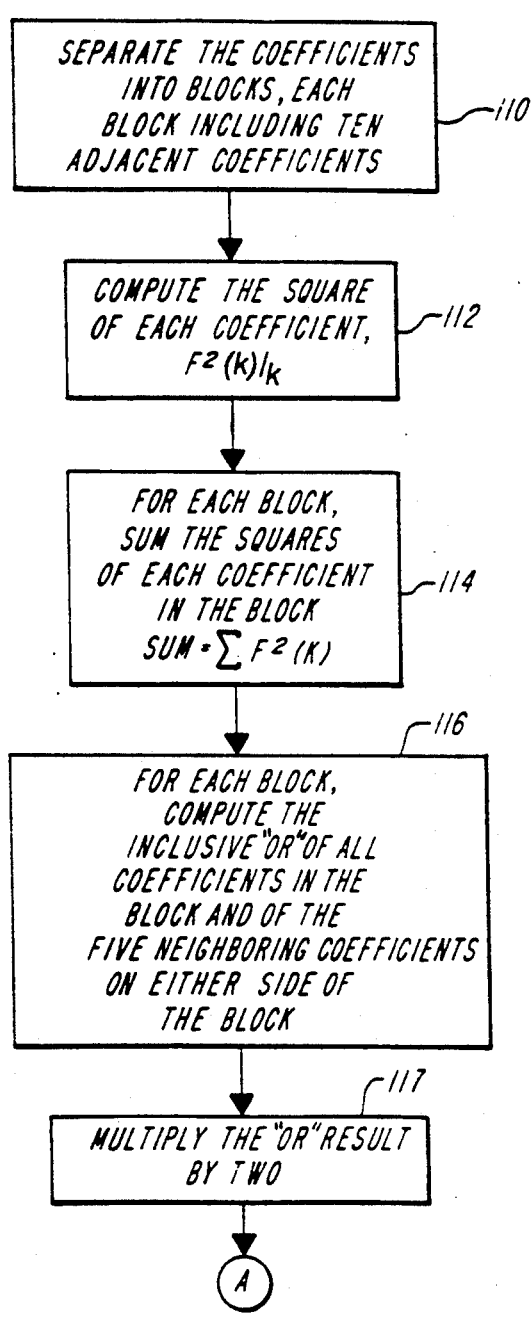
FIGS. 3(a) and 3(b) are a flow chart of a process for computing spectral estimates.
Figure 3B:
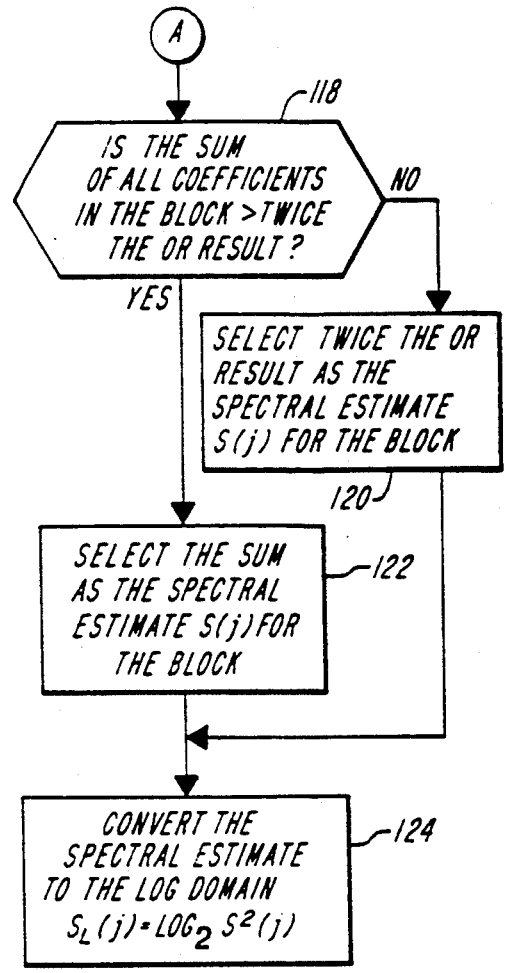

Referring to FIGS. 2(a-c) and 3(a-b), the following describes the spectrum estimation module 38 in further detail. Module 38 first separates the frequency coefficients F(k) into bands of L adjacent coefficients, where L is preferably equal to 10. (Step 110). For each band, j, the module prepares a first approximation sample, representative of the entire band, by computing the energy of the spectrum in the band. More specifically, module 38 squares each frequency coefficient F(k) in the band and sums the squares of all coefficients in the band. (Steps 112, 114) (See also FIGS. 2(b), 2(c))

This approximation may provide a poor representation of the spectrum if the spectrum includes a high energy tone at the border between adjacent bands. For example, the spectrum shown FIG. 2(b) includes a tone 50 at the border between band 52 and band 54. Interpolating between approximation sample 58 (representing the sum of the squares of all coefficients in band 54) and approximation sample 56 (representing the sum of the square of all coefficients in band 52) yields a value 59 which does not accurately reflect the presence of tone 50.

Accordingly, module 38 also employs a second approximation technique wherein the spectral estimates for both bands 52 and 54 will reflect the presence of a tone 50 near the border between the bands.

More specifically, module 38 derives a second approximation for each band using the ten samples in the band and five neighboring samples from each adjacent band. (See FIG. 2(a)) Module 38 performs the logical inclusive "OR" operation on the binary values of all twenty samples. (Step 116). This operation provides a computationally inexpensive estimate of the magnitude of the largest sample in the set. More specifically, each digit of the binary result of an "OR" operation is set to one if any of the operand binary values have a one in the digit (e.g., 0110 "OR" 0011=0111). Accordingly, the result of the "OR" operation is at a minimum equal to the magnitude of the largest sample in the set and at most equal to twice its magnitude. The result of the OR operation is then doubled to form the second approximation. (Step 117).

As shown in FIG. 2(a), the second approximation in band 52 yields a relatively large approximation value 60 for band 52 since the approximation includes tone 50 from band 54. The second approximation 60 more accurately reflects the presence of tone 50 than the first approximation 56. Accordingly, for each band, module 38 compares the second approximation to the first approximation (Step 118) and selects the larger of the two as the squared spectral estimate S$^2$(j). (Steps 120–122). Finally, module 38 computes the logarithm of the squared spectral estimate Log$_2$ S$^2$(j)). (Step 224).

Speech Detector for Calculating The Signal index Ai

Figure 4:
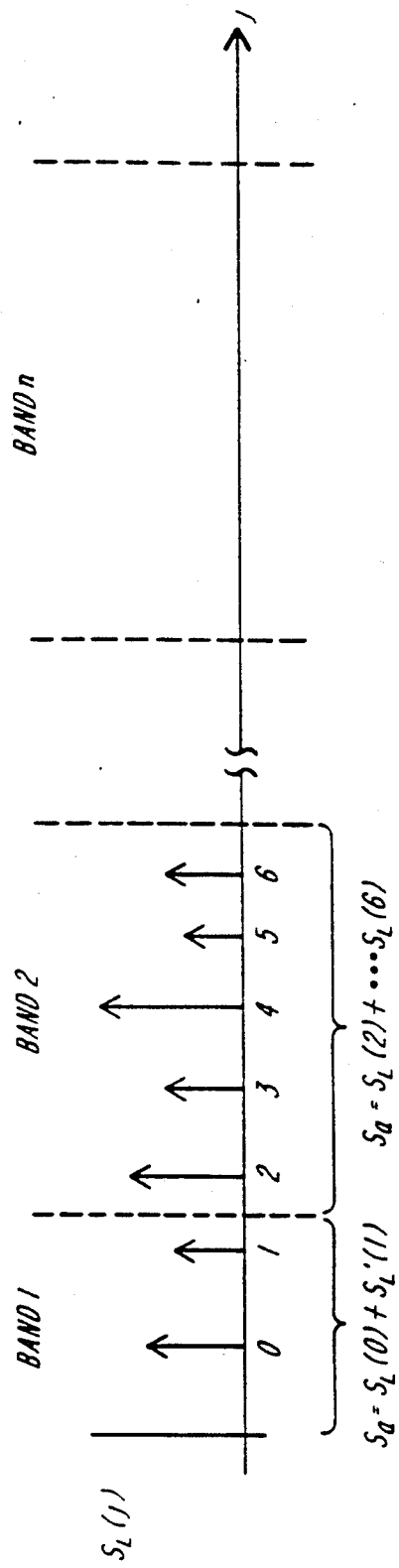
FIG. 4 is a diagram of a set of spectral estimates arranged in broad bands.

Referring to FIG. 4, speech detector 40 computes a signal index A$_i$(F) representative of the relative amount of voice energy in the frame. Toward this end, detector 40 groups the samples of spectral estimates into broad bands of frequencies. The broad bands have varying widths, nonuniformly distributed across the spectrum. For example, the first broad band may be larger than the second broad band which is smaller than the third.

Figure 5:
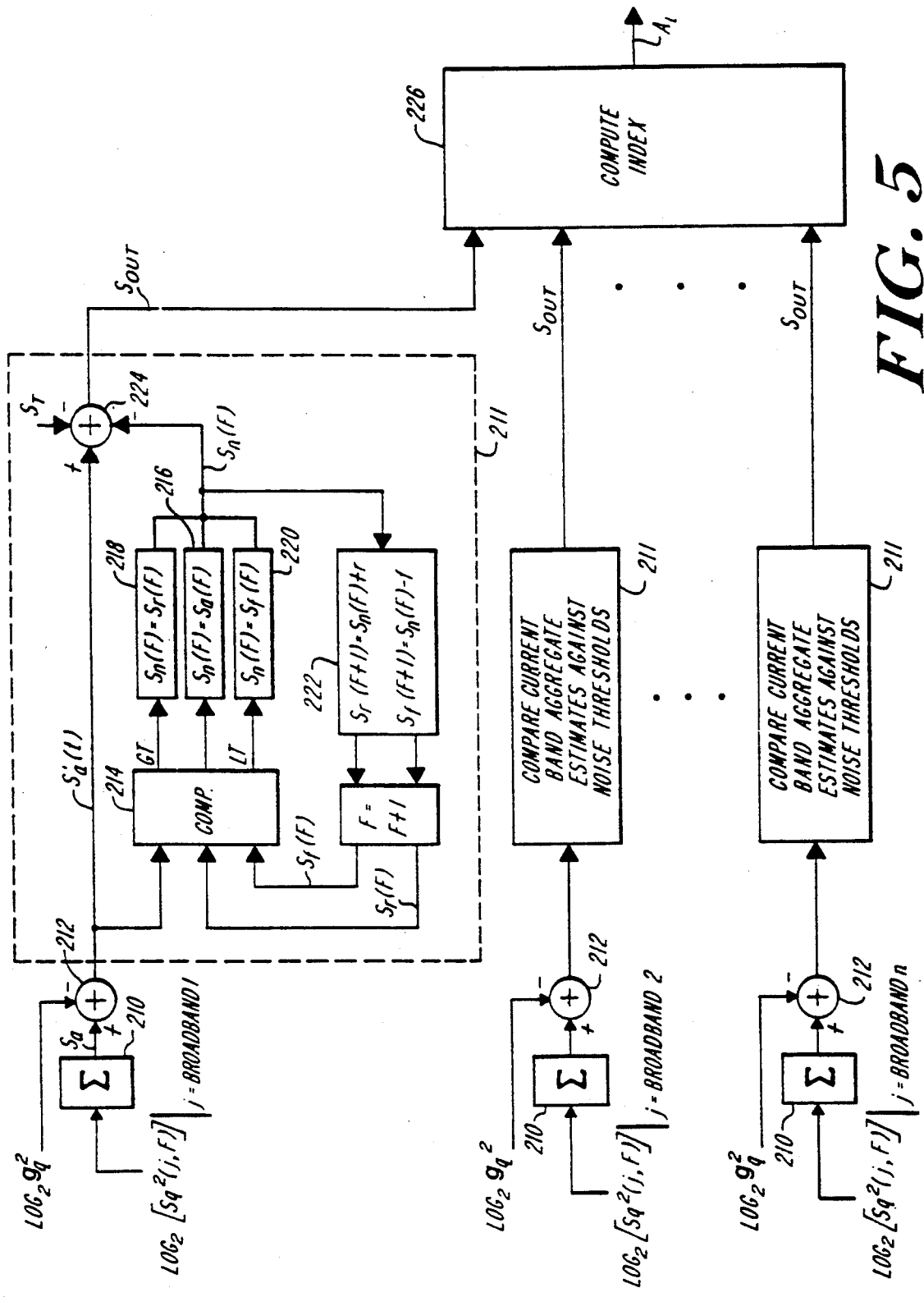
FIG. 5 is a block diagram of a speech detector.

Referring to FIG. 5, the speech detector estimates the amount of background noise S$_n$ in each broad band. For each broad band, speech detector 40 forms an aggregate estimate S$_a$(F) as follows:

$$S_a(F) = \text{Log}_2 \left( \sum_{j=x}^{Y} S^2(j,F) \right) \quad (3)$$

where F is an integer identifying the current frame, and Y and X are numbers representing the upper and lower frequencies respectively of the broad band. (Step 210). As will be explained in more detail below, the speech detector then compares the aggregate estimate of the current frame against a pair of noise thresholds (derived from prior band aggregate estimates from prior frames) to determine the amount of the noise in the band. (Step 211). In general, a frame having a relatively low aggregate estimate likely includes little voice energy in the broad band. Accordingly, the aggregate estimate in such a frame provides a reasonable estimate of the background noise in the broad band.

To compare aggregate estimates against the noise thresholds, the speech detector must first unnormalize each aggregate estimate. Otherwise, the estimates from the present frame will be on different scales than those of the prior frames and the comparison will not be meaningful. Accordingly, the speech detector unnormalizes the aggregate estimate by first computing $Log_2(g_q^2)$ to place the normalization gain in the same logarithmic scale as the aggregate estimates. It then adds the scaled normalization gain $Log_2(g_q^2)$ to the aggregate estimate to unnormalize the estimate. (Step 212).

This unnormalized estimate is then compared to an upper threshold $S_r(F)$ and a lower threshold $S_f(F)$ where F identifies the current frame. (Step 214). As explained more fully below, the thresholds are computed for each frame based on the value of a noise estimate from the prior frame. Since the first frame lacks a predecessor, the upper threshold for the first frame, $S_r(0)$, is initialized to a value "r" and the lower threshold $S_f(0)$ is initialized to $-f$, where f is substantially greater than r (e.g., $r=1$, and $f=10$).

If the aggregate estimate $S_a(F)$ is between the thresholds, the speech detector sets the noise estimate for the frame equal to the aggregate estimate (Step 216):

$$S_n(F) = S_a(F) \quad (4)$$

If the aggregate estimate is greater than the upper threshold, the noise estimate is set equal to the upper threshold (Step 218):

$$S_n(F) = S_r(F) \quad (5)$$

Finally, if the aggregate estimate is below the lower threshold, the noise estimate is set equal to the lower threshold (Step 220):

$$S_n(F) = S_f(F) \quad (6)$$

Before computing the noise estimate for the next frame, the speech detector adjusts the thresholds for the next frame $S_f(F+1)$, $S_r(F+1)$ such that they straddle the noise estimate for the current frame $S_n(F)$. (Step 222) More specifically, for the next frame, $F=F+1$, the speech detector calculates an upper noise threshold from the current frame's noise estimate as follows:

$$S_r(F+1) = S_n(F) + r \quad (7)$$

Similarly, it calculates a lower threshold $S_f(F+1) = S_n(F) - f$.

Thus, for each new frame, the speech detector calculates a noise estimate and adjusts the upper and lower noise thresholds to straddle the noise estimate.

This technique adaptively adjusts the noise estimates over time such that the noise estimate in a given broad band of a current frame approximately equals the most recent minimum aggregate estimate for the broad band. For example, if a series of frames arrive having no voice component in a broad band, the aggregate estimates will be relatively small since they reflect only the presence of background noise. Thus, if these aggregate values are below the lower threshold, $S_f$, the above technique will quickly reduce the noise estimate in relatively large increments, f, until the noise estimate equals a value of the relatively low aggregate estimate.

Once frames having a voice component begin to arrive, the noise estimate remains relatively low, stepping upward in relatively small increments r. By allowing the noise level to increment upward, the speech detector is able to detect increases in the background noise. However, since a relatively small increment "r" is used, the noise estimate tends to remain near the most recent minimum aggregate estimate. This prevents the speech detector from mistaking transient voice energy for background noise.

After calculating the noise estimates for a frame, the speech detector subtracts the noise estimate $S_n(F)$ from the frame's aggregate estimate $S_a(F)$ to obtain an estimate of the voice signal in the broad band. (Step 224). It also subtracts a threshold constant $S_T$ from the aggregate estimate to generate a signal $S_{out}$ representative of the extent to which the voice signal exceeds the specified threshold $S_T$. (Step 224). Finally, the speech detector computes the index $A_i(F)$ for the entire frame from the collection of $S_{out}$ signals and the normalization gain $g_q$. (Step 226).

Figure 6:
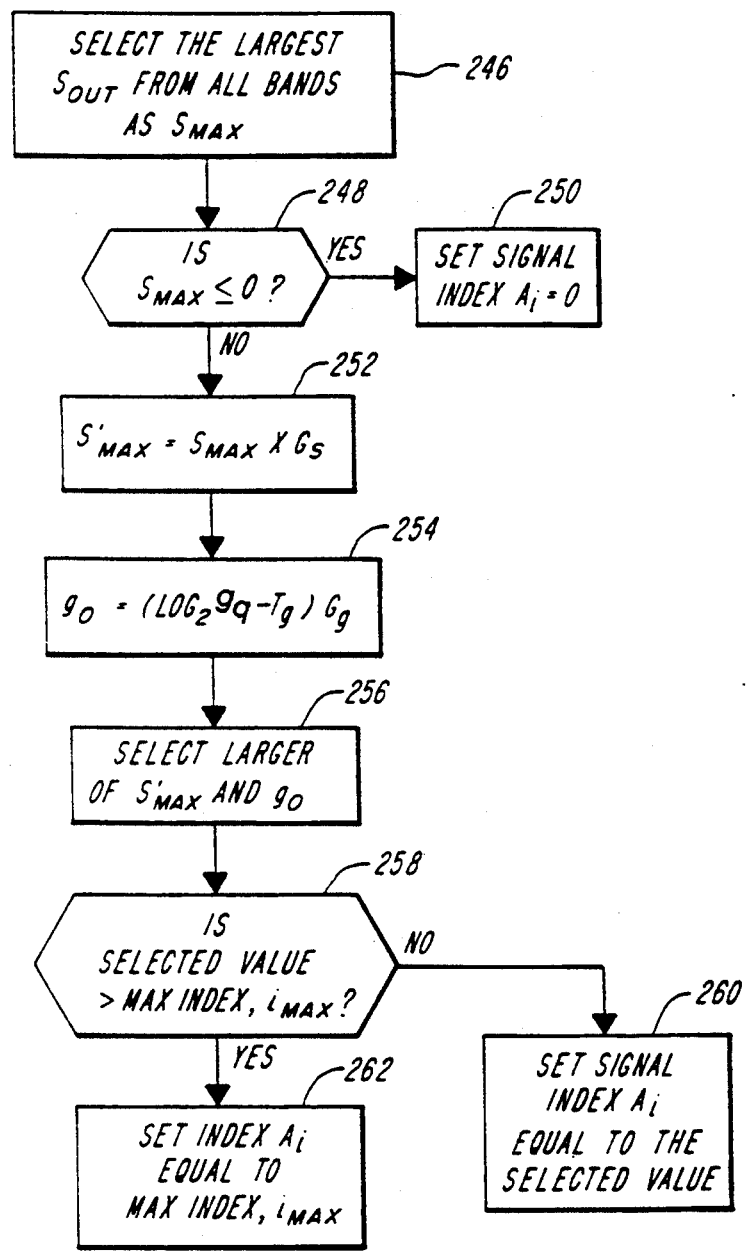
FIG. 6 is a flow chart of a process for estimating the amount of voice in a frame of the microphone signal.

Referring to FIG. 6, the following describes in further detail the calculation of $A_i(F)$ from the collection of $S_{out}$ signals. The speech detector first selects the largest $S_{out}$ from all broad bands. (Step 246). If the selected value, $S_{max}$, is less than or equal to zero, all broad bands likely have no voice component. (Step 248). Accordingly, the speech detector sets the index $A_i(F)$ to zero indicating that the broad bands contain only noise. (Step 250).

If $S_{max}$ is greater than zero, (Step 248) the speech detector calculates the index $A_i(F)$ from the value of $S_{max}$. Toward this end, it scales $S_{max}$ by a fixed gain $G_s$ i.e., $S'_{max} = S_{max} * G_s$ where $G_s$ preferably is approximately 0.2734. (Step 252). It next computes a correspondingly attenuated representation $g_o$ of the normalization gain as follows:

$$g_o = (Log_2 g_q - T_g) * G_g \quad (8)$$

where $T_g$ and $G_g$ are predefined constants e.g., $T_g = 4096$ and $G_g = 0.15625$. (Step 254). If $g_o$ is greater than $S'_{max}$, the speech detector assumes that $S_{max}$ is less than the voice energy in the frame. Accordingly, it selects $g_o$ as the index $A_i(F)$. (Step 256). Otherwise, it selects $S'_{max}$ as the index $A_i(F)$. (Step 256). Finally, the speech detector compares the selected index to a maximum index $i_{max}$. (Step 258). If the selected index exceeds the maximum index, the speech detector sets the index $A_i(F)$ equal to its maximum value, $i_{max}$. (Step 262). Otherwise, the selected value is used as the index. (Step 260).

Bit Rate Estimator for Calculating Step Sizes Q(k) and Class Information C(j)

Referring to FIG. 1(a), the bit rate estimator 42 receives the index $A_i(F)$ and the quantized log spectral estimates $Log_2 S_q^2(j)$. In response, it computes a step size Q(k) for each frequency coefficient and a class indicator c(j) for each band j of frequency coefficients. The quantization step size Q(k) is used by quantizer 44 to quantize the frequency coefficients. The class indicator c(j) is used by Huffman encoder 47 to select the appropriate coding tables.

Figure 7:
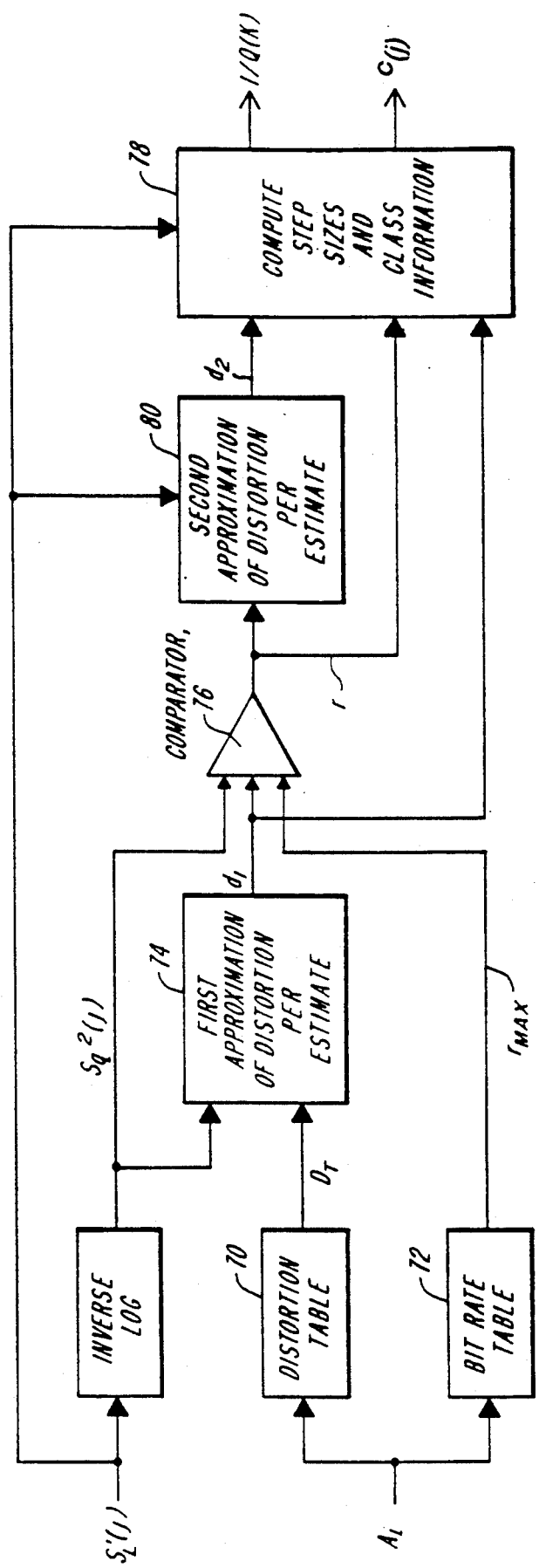
FIG. 7 is a block diagram of a bit rate estimator.

The following describes in further detail the procedure used by bit rate estimator 42 to compute the step size and class information. Referring to FIG. 7, the bit estimator includes a first table 70 which contains a predetermined aggregate allowable distortion value $D_T$ for each value of the signal index $A_i(F)$. Each value $D_T$ represents an aggregate quantization distortion error for the entire frame. A second table 72 contains, for each value of index $A_i(F)$, a predetermined maximum number of bits $r_{max}$ initially allocated to the frame. (As explained below, more bits may be allocated to the frame if necessary.) The stored bit rates $r_{max}$ increase with $A_i(F)$. To the contrary, the stored distortion values $D_T$ decrease with each increase in $A_i(F)$. For example, for $A_i(F)$ equals zero, (i.e., 100% noise) the tables provide a small bit rate and a high allowable distortion. For $A_i(F)$ equal seven, (i.e., 100% audio) the tables provide a high bit rate and a low allowable distortion. Based on the value of index $A_i(F)$, the first and second tables select an aggregate allowable quantization distortion $D_T$ and an allowable maximum number of bits $r_{max}$. This allowable distortion $D_T$ is provided to a first distortion approximation module 74. Module 74 then computes a first allowable sample distortion value $d_1$ representative of the allowable distortion per estimate. The sample distortion value $d_1$ is then used in deriving $c(j)$ and a block quantization step size $Q(k)$.

Calculation of a First Estimate of the Allowable Distortion, $d_1$

Figure 8A:
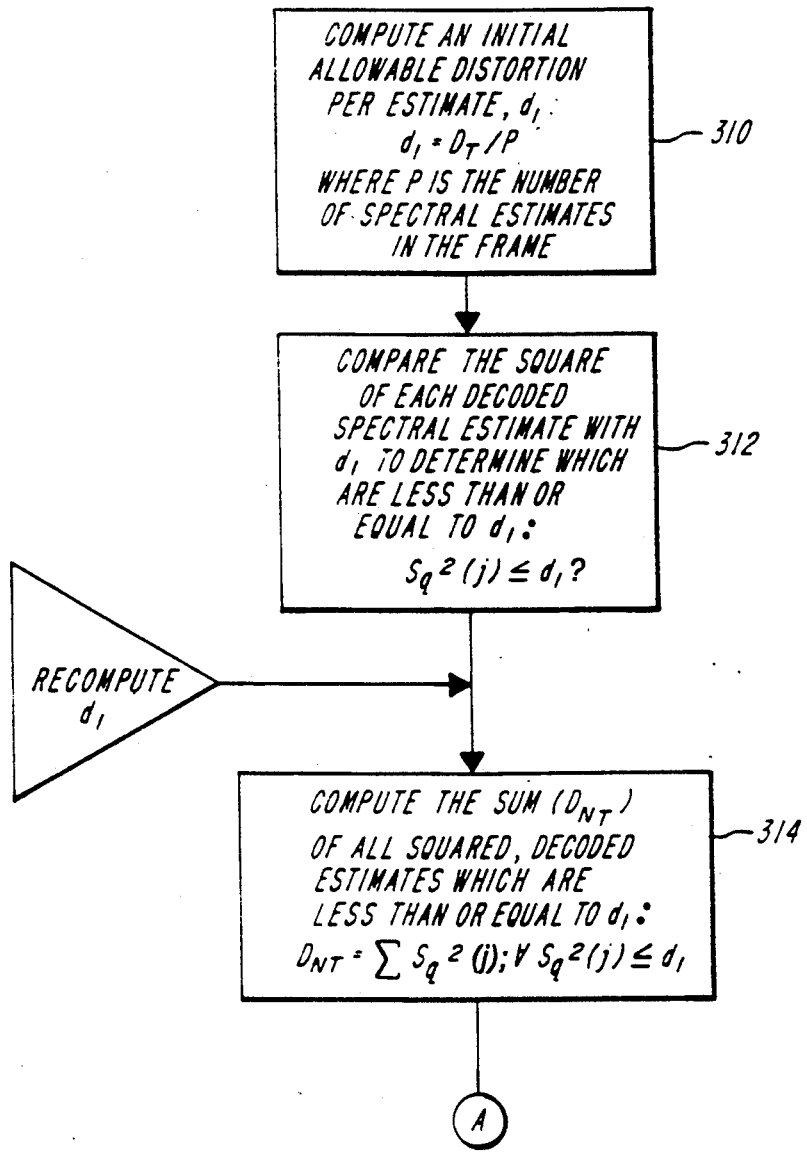
FIGS. 8(a) and 8(b) are a flow chart of a process for computing a first estimate of the allowable distortion per spectral estimate.
Figure 8B:
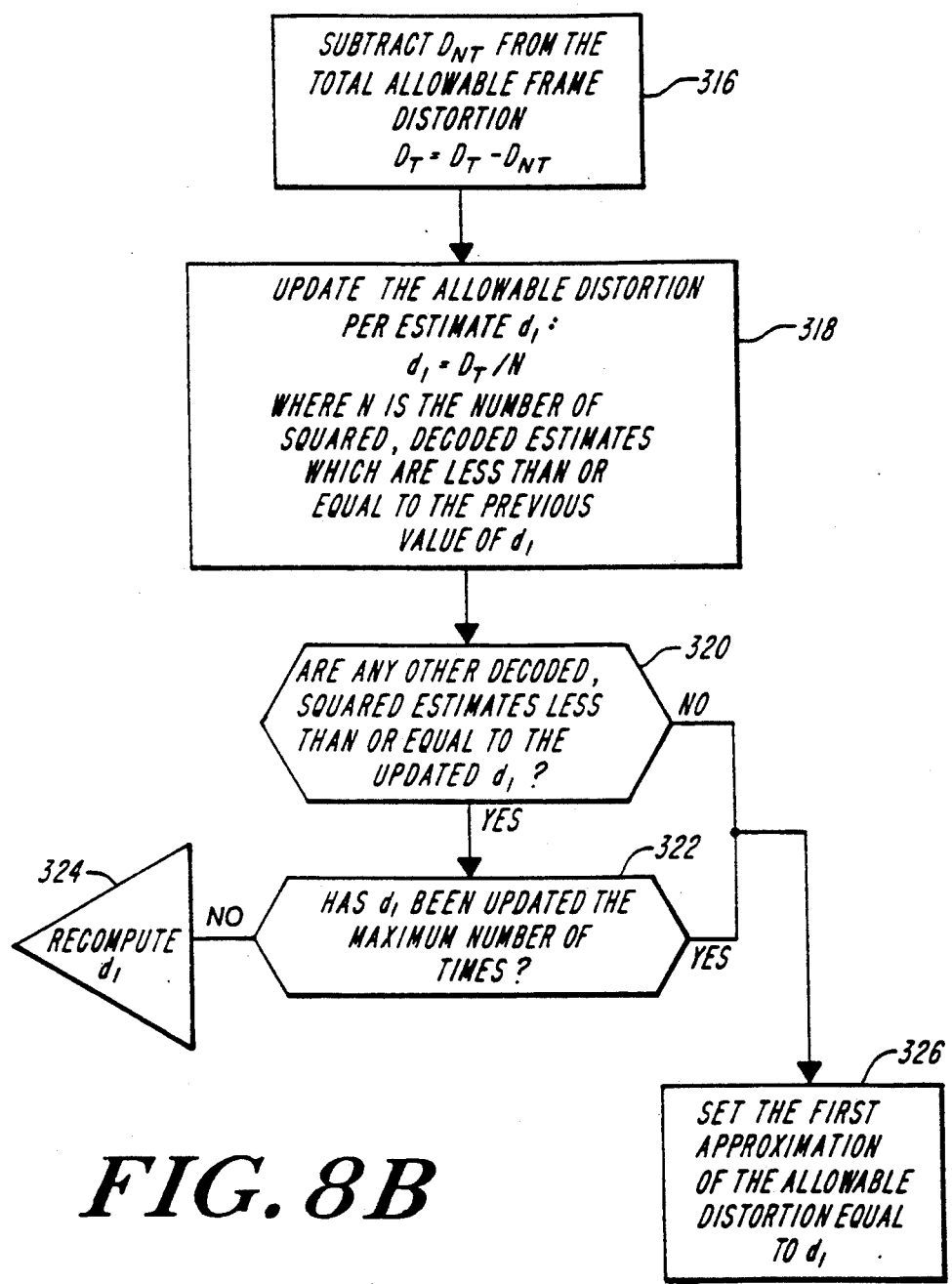

Referring to FIGS. 8(a) and 8(b), module 74 first computes an initial value of the sample distortion value $d_1$ by dividing the allowable aggregate distortion $D_T$ by the number of spectral estimates P. (Step 310). As will be explained more fully below, only frequency coefficients from a band whose squared spectral estimate is sufficiently greater than a final quantization distortion value $d_w$ will be coded for transmission. Thus, the allowable quantization value operates as a noise threshold for determining which coefficients will be transmitted. Accordingly, module 74 performs an inverse logarithm operation on the log spectral estimates $\text{Log}_2 S_q^2(j)$ to form the square of the quantized spectral estimates $S_q^2(j)$. Module 74 tentatively assumes that if the squared spectral estimate $S_q^2(i)$ is less than or equal to $d_1$, the spectral estimate's constituent frequency coefficients (referred to herein as "noisy samples") will not be coded. (Step 312). Module 74 accordingly increases the sample distortion value $d_1$ to reflect the fact that such constituent coefficients will not be coded. More specifically, it computes the sum $D_{NT}$ of all squared spectral estimates which are less than or equal to $d_1$ (Step 314):

$$D_{NT} = \Sigma S_q^2(j); \forall S_q^2(j) \leq d_1 \qquad (9)$$

It then subtracts the sum from the aggregate allowable distortion DT (Step 316) and divides the result by the number of remaining spectral estimates N to compute an adjusted sample distortion value $d_1$ (Step 318):

$$d_1 = (D_T - D_{NT})/N \qquad (10)$$

where N is the number of squared spectral estimates above the initial distortion value $d_1$. Since $d_1$ may now be greater than its initial value, module 74 compares each squared spectral estimate to the new $d_1$ to determine if any other coefficients will not be coded. (Step 320). If so, the estimator repeats the process to compute an adjusted sample distortion value $d_1$. (Steps 322, 324). The search terminates when no additional squared spectral coefficients are less than or equal to an adjusted sample distortion value $d_1$ (Step 320). It also terminates after a maximum number of allowable iterations. (Steps 322). The resultant sample distortion value $d_1$ is then provided to a bit rate comparator 76 (FIG. 7). (Step 326).

Referring again to FIG. 7, based on the first sample distortion value $d_1$ and the log spectral estimate $\text{Log}_2 S_q^2(j)$, comparator 76 computes a tentative number of bits per frame "r" as follows:

$$r = \tfrac{1}{2} \Sigma \text{Log}_2 S_q^2(j) - \text{Log}_2 d_1; \forall S_q^2(j) \geq d_1 \qquad (11)$$

It then compares the estimated number of bits to the maximum allowable number of bits per frame, $r_{max}$. If r is less than the maximum, $r_{max}$, comparator 76 signals module 78 to compute step sizes for the frequency coefficients based on the first sample distortion value $d_1$. However, if r exceeds the maximum $r_{max}$, comparator 76 assumes that more distortion per estimate must be tolerated to keep the number of bits below $r_{max}$. Accordingly, it signals a second distortion approximation module 80 to begin an iterative search for a new distortion value $d_2$ which will yield a bit rate below $r_{max}$.

Second Estimate of the Allowable Distortion, $d_2$

Figure 9:
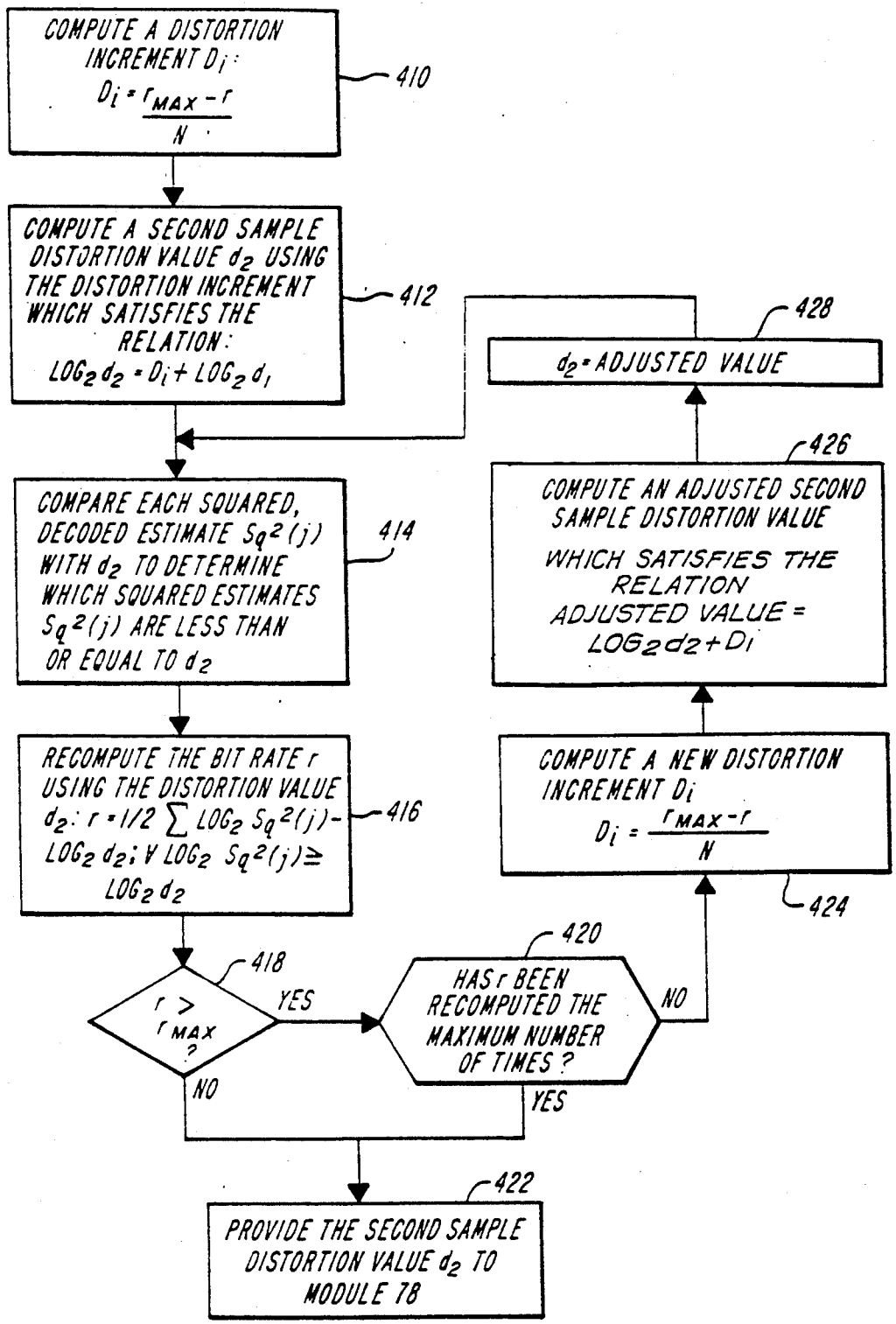
FIG. 9 is a flow chart of a process for computing a second estimate of the allowable distortion per spectral estimate.

Referring to FIG. 9, approximation module 80 initially computes a distortion increment value $D_i$ which satisfies the relation (Step 410):

$$D_i = \frac{r_{max} - r}{N} \qquad (12)$$

The distortion increment value $D_i$ is an estimate of a necessary increment in the first sample distortion value to reduce the bit rate below the maximum $R_{max}$. Accordingly, the approximation module computes a new distortion value $d_2$ which satisfies the relation (Step 412):

$$\text{Log}_2 d_2 = D_i + \text{Log}_2 d_1 \qquad (13)$$

In the same manner described above, it then compares each squared spectral estimate $S_q^2(j)$ to $d_2$ to determine which estimates are less than or equal to the distortion, thereby predicting which frequency coefficients will not be coded. (Step 414). Based on this prediction, module 80 again computes the total number of bits r required for the frame according to the following equation (Step 416):

$$r = \tfrac{1}{2} \Sigma (\log_2 S_q^2(j) - \text{Log}_2 d_2); \forall S_q^2(j) \geq d_2 \qquad (14)$$

Module 80 again compares the bit rate r to the maximum $r_{max}$ to determine if the new distortion value $d_2$ yields a bit rate below the maximum. (Step 418). If so, module 80 provides $d_2$ to module 78 and notifies it to calculate the quantization step sizes $Q(j)$ based on both $d_2$ and $d_1$. (Step 422). If not, module 80 performs another iteration of the process in an attempt to find a distortion $d_2$ which will yield a sufficiently low bit rate r. (Steps 418, 420–428). However, if a maximum number of iterations have been tried without finding such a distortion estimate, the search is terminated and the most recent value of $d_2$ is supplied to module 78. (Steps 420, 422).

Figure 10:
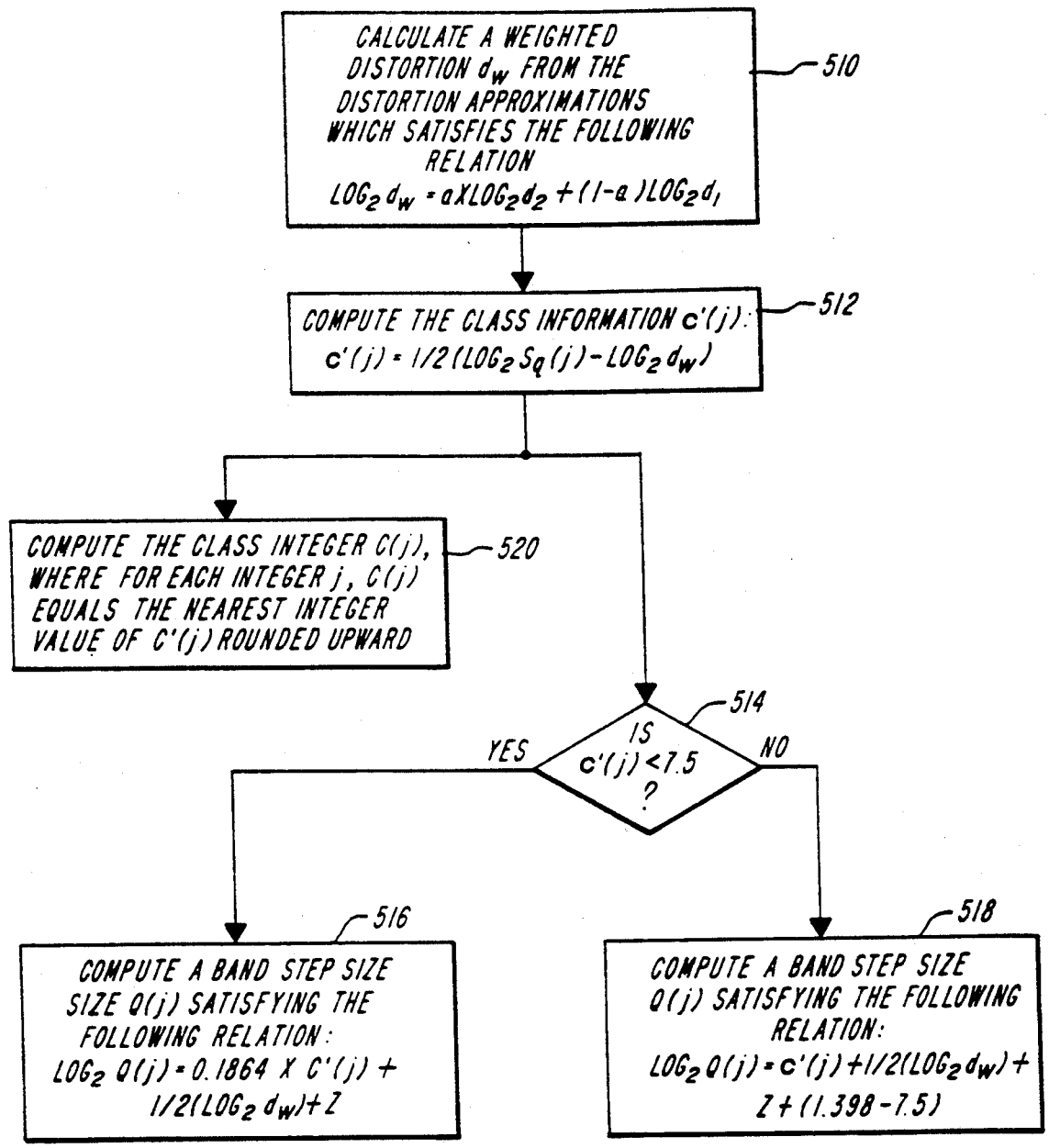
FIG. 10 is a flow chart of a process for computing quantization steps sizes.

Calculation of Step Sizes and Class Information From the Distortion Estimates Referring to FIG. 10, the module 78 combines the two estimates of allowable sample distortion values $d_1$, $d_2$ to form a weighted distortion $d_w$ satisfying the following relation:

$$Log_2 d_w = a\, log_2 d_2 + (1-a) log_2 d_1$$

where a is a constant weighting factor. (Step 510). (Note: If no value $d_2$ is calculated, the weighted distortion $d_w$ is set equal to the first estimate $d_1$). Based on the weighted distortion estimate $d_w$, module 78 computes the class parameter $c'(j)$ for each spectral estimate $S(j)$ as follows (Step 512):

$$c'(j) = \tfrac{1}{2}(Log_2 S_q^2(j) - log_2 d_w) \quad (16)$$

The class parameter $c'(j)$ is then rounded upward to the nearest integer value in the range of zero to eight to form a class integer $c(j)$. (Step 520). A class value of zero indicates that all coefficients in the class should not be coded. Accordingly, the class value $c(j)$ for each spectral estimate is provided to the quantizer to indicate which coefficients should be coded.

Class values greater than or equal to one are used to select huffman tables used in encoding the quantized coefficients. Accordingly, the class value $c(j)$ for each spectral estimate is provided to the huffman encoder 47.

Module 78 next computes a band step size $Q(j)$ for each spectral estimate, based on the value of the weighted distortion $d_w$ and the value of the class parameter $c'(j)$ for the estimate. (Steps 514–518). More specifically, for spectral estimates whose class values are less than 7.5, the step size $Q(j)$ is calculated to satisfy the following relation:

$$Log_2 Q(j) = 0.1864 * c'(j) + \tfrac{1}{2}(Log_2 d_w) + Z \quad (17)$$

where z is a constant offset value, e.g., $-1.47156$ (Step 516). For spectral coefficients whose class parameter $c'(j)$ is greater than or equal to 7.5, the step size is chosen to satisfy the following relation (Step 518):

$$Log_2 Q(j) = C'(j) + \tfrac{1}{2}(log_2 d_w) + Z + (1.398 - 7.5) \quad (18)$$

The band step sizes $Q(j)$ for each band j, are then interpolated to derive a step size $Q(k)$ for each frequency coefficient k within the band j. First, each band step size is scaled downward. In this regard, recall that the spectral estimate $S(j)$ for each band j was computed as the greater of 1) the sum of all squared coefficients in the band and 2) twice the logical OR of all coefficients in the block and of the ten neighboring samples. (See FIG. 2(a)–2(c)). Accordingly, the selected spectral estimate roughly approximates the aggregate energy of the entire band. However, the quantization step size for each coefficient should be chosen based on the average energy per coefficient within each band.

Figure 11:
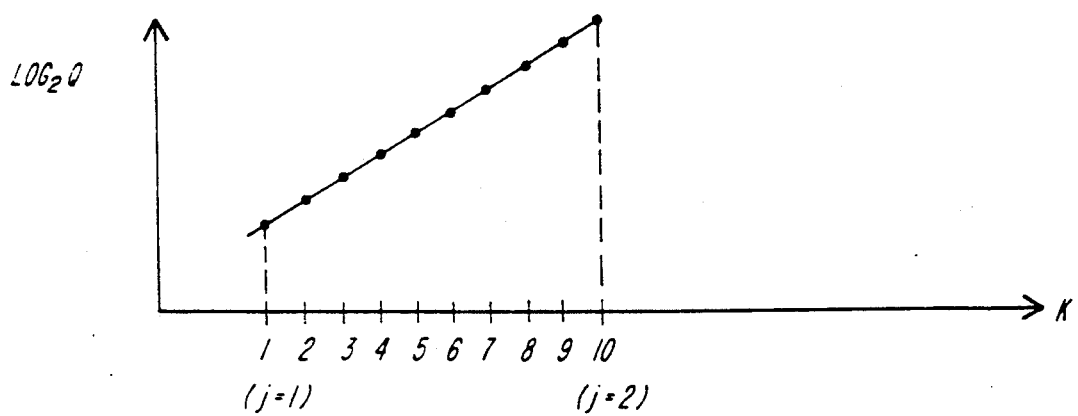
FIG. 11 is a diagram illustrating the interpolation between band quantization step sizes to form coefficient quantization step sizes.

Accordingly, the band step size $Q(j)$ is scaled downward by dividing it by the number of coefficients used in computing the spectral estimate for the band. (i.e., by either ten or twenty depending on the technique chosen to calculate $S(j)$). Next, bit rate estimator 42 linearly interpolates between the log band step sizes $Log_2 Q(j)$ to compute the logarithm of coefficient step sizes $log_2 Q(k)$. (See FIG. 11). Finally, the reciprocal of the coefficient step size is derived as follows:

$$1/Q(k) = -(log_2 Q(j))^{-1} \quad (19)$$

Quantization and Encoding of the Frequency Coefficients

Referring to FIG. 1(a), the class integers $c(j)$ and the quantization steps sizes $Q(k)$ are provided to the coefficient quantizer 44. Coefficient quantizer 44 is a midtread quantizer which quantizes each frequency coefficient $F(k)$ using its associated inverse step size $1/Q(k)$ to produce an index $I(k)$. The indices $I(k)$ are encoded for transmission by the combined operation of a limit controller 45 and a Huffman encoder 47.

Huffman encoder 47 includes, for each class $c(j)$, a Huffman table containing a plurality of Huffman codes. The class integers $c(j)$ are provided to Huffman encoder 47 to select the appropriate Huffman table for the identified class.

In response to an index $I(k)$, limit controller 45 generates a corresponding Huffman index $I_h(k)$ which identifies an entry in the selected Huffman table. Huffman encoder 47 then provides the selected Huffman code $F_h(k)$ to bit stream controller 20 for transmission to the far end.

Typically, limit controller 45 simply forwards the index $I(k)$ for use as the Huffman index $I_h(k)$. However, the range of possible indices $I(k)$ may exceed the input range of the corresponding Huffman table. Accordingly, for each class $c(j)$, limit controller 45 includes an index maximum and minimum. The limit controller compares each index $I(k)$ with the index maximum and minimum. If $I(k)$ exceeds either the index maximum or minimum, limit controller 45 clips $I(k)$ to equal the respective maximum or minimum and provides the clipped index to encoder 47 as the corresponding Huffman index.

For each frame, limit controller 45 also maintains a running tally of the number of bits required to transmit the Huffman codes. More specifically, the limit controller includes, for each Huffman table within Huffman encoder 47, a corresponding bit number table. Each entry in the bit number table indicates the number of bits of a corresponding Huffman code stored in the Huffman table of encoder 47. Thus, for each Huffman index $I_h(k)$ generated by limit controller 45, the limit controller internally supplies the Huffman index to the bit number table to determine the number of bits required to transmit the corresponding Huffman code $F_h(k)$ identified by the Huffman index $I_h(k)$. The number of bits are then added to the running tally. If the running tally exceeds a maximum allowable number of bits, limit controller 45 ignores the remaining indices $l(k)$. Limit controller 45 then prepares a unique Huffman index which identifies a unique Huffman code for notifying the far end receiver that the allowable number of bits for the frame has been reached and that the remaining coefficients will not be coded for transmission.

To transmit the unique Huffman code, the limit controller must allocate bits for transmission of the unique code. Accordingly, it first discards the most recent Huffman code and recomputes the running tally to determine if enough bits are available to transmit the unique Huffman code. If not, the limit controller repeatedly discards the most recent Huffman code until enough bits are allocated for the transmission of the unique Huffman code.

Reconstruction of the Microphone Signal At the Far End

Referring again to FIG. 1(b), far end audio decoder 28 reconstructs the microphone signal from the set of encoded signals. More specifically, a Huffman decoder 25 decodes the Huffman codes $S_h(j)$ to reconstruct the encoded log spectral estimates $S_e(j)$. Decoder 27 (identical to decoder 41 of the audio encoder 16 (FIG. 1(a)) further decodes the encoded log spectral estimates to reconstruct the quantized spectral estimates $\text{Log}_2 S_q^2(i)$.

The log spectral estimates $\text{Log}_2 S_q^2(j)$ and the received signal index $A_i(F)$ are applied to a bit rate estimator 46 which duplicates the derivation of classes $c(j)$ and step sizes $Q(k)$ performed by bit rate estimator 42 at the near end. The derived class information $c(j)$ is provided to a Huffman decoder 47 to decode the Huffman codes $F_h(k)$. The output of the Huffman decoder 47 is applied to a coefficient reconstruction module 48, which, based on the derived quantization step sizes $Q(k)$, reconstructs the original coefficients $F_q(k)$. The bit rate estimator 46 further supplies class information $c(j)$ to a coefficient fill-in module 50 to notify it of which coefficients were not coded for transmission. Module 50 then estimates the missing coefficients using the reconstructed log spectral estimates $\text{Log}_2 S_q^2(j)$.

Finally, the decoded coefficients $F_q(k)$ and the estimated coefficients $F_e(k)$ are supplied to a signal composer 52 which converts the coefficients back to the time domain and unnormalizes the time domain signal using the reconstructed normalization gain $g_q$.

More specifically, an inverse DCT module 51 merges the decoded and estimated coefficients $F_q(k)$, $F_e(k)$ and transforms the resultant frequency coefficient values to a time domain signal $m'(n)$. An inverse normalization module 53 scales the time domain signal $m'(n)$ back to the original scale. The resultant microphone signal $m(n)$ is applied to an overlap decoder 55 which removes the redundant samples introduced by windowing module 32 of the audio encoder 16. (FIG. 1(a)). A signal conditioner 57 filters the resultant microphone signal and converts it to an analog signal $L(t)$ for driving loudspeaker 29.

Estimation of Uncoded Coefficients

As explained above, the human ear is less likely to notice distortion of an audio signal in regions of the signal's spectrum having a relatively large energy level. Accordingly, bit rate estimator 42 (FIG. 1) adjusts the quantization step size to finely quantize coefficients having a low energy level and coarsely quantize coefficients having a large energy level. In apparent contradiction to this approach, the bit rate estimator simply discards coefficients having a very low energy level.

The absence of these coefficients would result in noticeable audio artifacts. Accordingly, a coefficient fill-in module 50 prepares a coefficient estimate of each discarded coefficient from the spectral estimates. It then inserts the coefficient estimate in place of the missing coefficient to prevent such audio artifacts. In doing so, the coefficient module considers the level of the signal index $A_i$ for the frame in which the uncoded coefficient resides. If, for example, the signal index is low, (indicating that the frame largely consists of background noise), the fill-in module assumes the missing coefficient represents background noise. Accordingly, it prepares the coefficient estimate largely from a measure of the background noise in the frame. However, if the signal index is large, (indicating that the frame consists largely of a voice signal), the noise fill-in module assumes that the missing coefficient represents a voice signal. Accordingly, it prepares the coefficient estimate largely from the value of the spectral estimate corresponding to the band of frequencies which includes the frequency of the missing coefficient.

Figure 12:
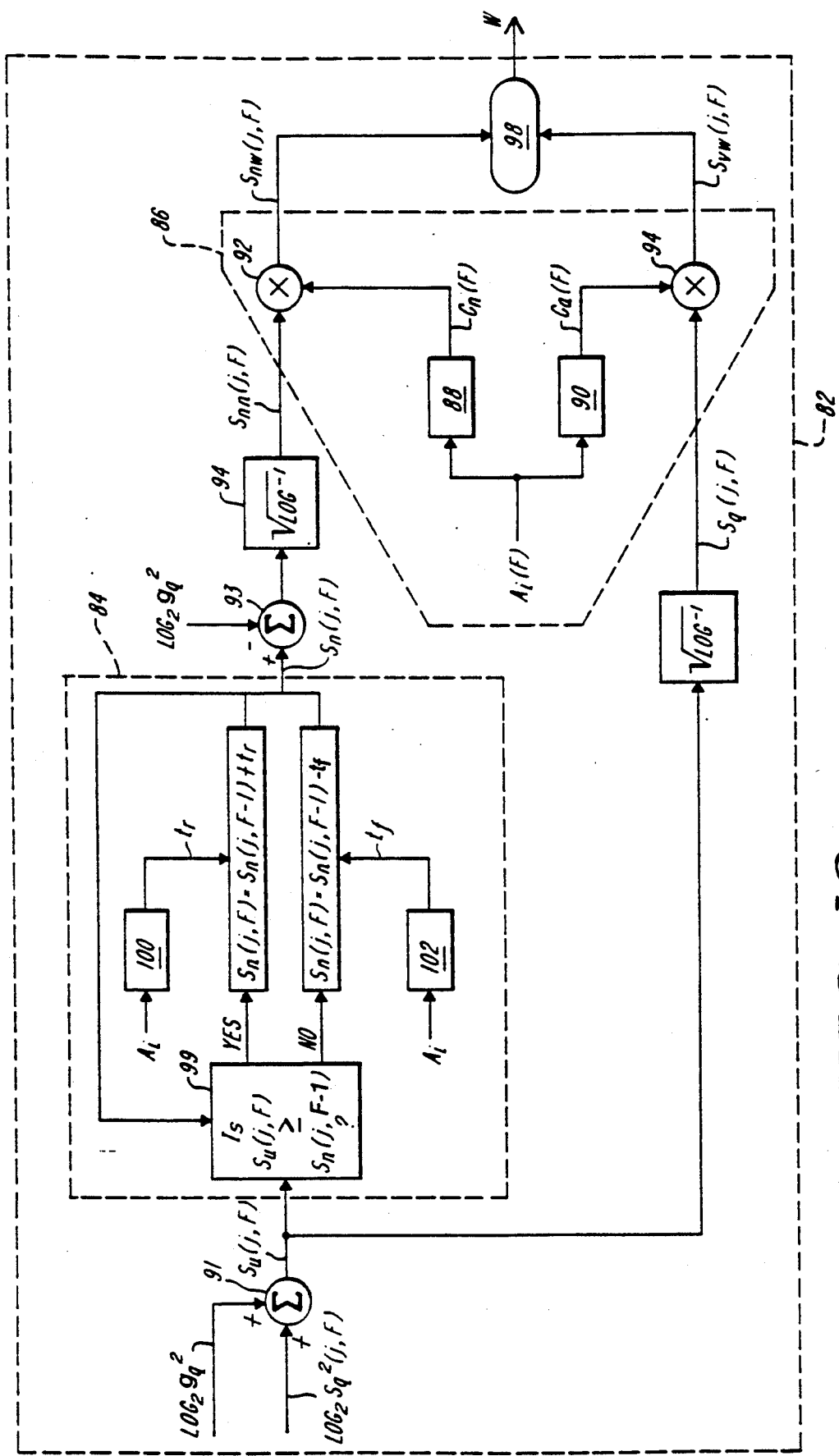
FIG. 12 is a block diagram of a coefficient fill-in module.

Referring to FIG. 12, coefficient fill-in module 50 (FIG. 1(b)) includes a coefficient estimator module 82 for each band. Each estimator module 82 includes a noise floor module 84 for approximating, for each Frame F, the amount of background noise in the band of frequencies j. The noise estimate $S_n(j,F)$ is derived from a comparison of the log spectral estimate $\text{Log}_2 S_q^2(j)$ of the current frame with a noise estimate derived from spectral estimates of previous frames. An adder 91 adds the log spectral estimate to the log gain, $\log_2 g_q^2$, to unnormalize the log spectral estimate. The unnormalized estimate $S_u(j, F)$ is applied to a comparator 99 which compares $S_u(j, F)$ to the noise estimate $S_n(j,F-1)$ calculated for the previous frame F-1 ($S_n$ is initialized to zero for the first frame). If $S_u(j, F)$ is greater than the previous noise estimate $S_n(j, F-1)$, the noise estimate for the present frame F is computed as follows:

$$S_n(j, F) = S_n(j, F-1) + t_r \quad (20)$$

where $t_r$ is a rise time constant provided by table 100. More specifically, table 100 provides a unique $t_r$ for each value of the signal index $A_i(F)$. (e.g., for $A_i(F)=0$, a relatively large time constant $t_r$ is chosen to yield a long rise time. As $A_i(F)$ increases, the selected time constant decreases).

If $S_u(j, F)$ is less than the previous noise estimate, $S_n(j, F-1)$, the noise for the current frame is computed as follows;

$$S_n(j, F) = S_n(j, F-1) - t_f \quad (21)$$

where $t_f$ is a fall time constant provided by table 102. Table 102, like table 100, provides a unique constant $t_f$ for each value of the index $A_i(F)$. Adder 93 normalizes the resultant noise estimate $S_n(j, F)$ by subtracting the log gain, $\log_2 g^2_q$. The output of 93 is then applied to a log inverter 94 which computes the inverse logarithm as show below to provide a normalized noise estimate $S_{nn}(j, F)$:

$$S_{nn}(j,F) = \sqrt{\text{Log}^{-1}(\text{Log}_2 S_n^2(j,F) - \text{Log}_2 g_q^2)} \quad (22)$$

For each frame, the normalized band noise estimates, $S_{nn}(j, F)$, and the spectral estimate $S_q(j, F)$ are applied to a weighting function 86 which prepares weighted sum of the two values. Weighting function 86 includes a first table 88 which contains, for each value of signal index $A_i(F)$, a noise weighting coefficient $C_n(F)$. Similarly, a second table 90 includes for each index $A_i(F)$, a voice weighting index $C_a(F)$. In response to the current value of the audio index $A_i(F)$, table 88 provides a corresponding responding noise weighting coefficient $C_n(F)$ to multiplier 92. Multiplier 92 computes the product of $C_n(F)$ and $S_{nn}(j, F)$ to produce a weighted noise value $S_{nw}(j, F)$. Similarly, table 90 provides a voice weighting coefficient $C_a(F)$ to multiplier 94 to compute a weighted voice value $S_{vw}(j, F)$ where $S_{vw} = S_q(j, F) C_a$.

The weighted values are provided to a composer 98 which computes a weight estimate as follows:

$$W = (S_{vw} + S_{nw})^2 \tag{23}$$

The weighting coefficients $C_a$, $C_n$ stored in tables 90, 88 are related as follows $C_a = 1 - C_n$, where the values of $C_n$ may range between zero (for $A_i = 7$) and one (for $A_i = 0$). Thus, during silence, the noise estimate carries more weight, while the spectral estimate carries gradually more weight as the audio index increases.

This weighted estimate is then supplied to signal composer 52 for use in computing the estimated frequency coefficient $F_e(k)$ for each of the ten uncoded frequency coefficients corresponding to the spectral estimate.

More specifically, the weighted estimate, W, is used to control the level of "fill-in" for each missing frequency coefficient (i.e. those with a class of zero). The fill-in consists of scaling the output from a random number generator (with a uniform distribution) and inserting the result, $F_e$ in place of the missing frequency coefficients. The following equation is used to generate the fill-in for each missing frequency coefficient.

$$F_e = \sqrt{\frac{e \times w \times \text{noise} \times \text{noise}}{n^2}}$$

Where "noise" is the output from the random number generator at given instant (or coef/sample), the range of the random number generator being twice the value n; and wherein e is a constant, e.g., 3. Note that a new value of noise is generated for each of the missing frequency coefficients.

Additions, subtractions, deletions and other modifications of the preferred particular embodiments of the invention will be apparent to those practiced in the art and are within the scope of the following claims.

What is claimed is:

1. A method for allocating a variable number of transmission bits on a frame-by-frame basis for use in transmitting samples of a digital signal, the method comprising the steps of:
   selecting an aggregate allowable quantization distortion value representing a collective allowable quantization distortion error for a frame of samples of said digital signal,
   selecting from said frame of samples, a set of samples wherein each of a plurality of samples of said set is greater than a noise threshold,
   computing, for each sample of said set, a sample quantization distortion value representing an allowable quantization distortion error for said sample, wherein a sum of all sample quantization distortion values for all samples of said set is approximately equal to said aggregate allowable quantization distortion value,
   for each sample of said set, selecting a quantization step size which yields a quantization distortion error approximately equal to said sample's corresponding quantization distortion value, and
   quantizing said sample using said quantization step size.

2. The method of claim 1 wherein selecting a quantization step size comprises the step of calculating a quantization step size for each sample to be transmitted based, at least in part, on the difference between said sample and said sample's corresponding quantization distortion value.

3. The method of claim 1 wherein said digital signal includes a noise component and a signal component, and wherein said selection of an aggregate allowable quantization distortion comprises the steps of:
   preparing a signal index representing, for at least one sample of said frame, the magnitude of said signal component relative to the magnitude of said noise component, and
   based on said signal index, selecting said aggregate allowable quantization distortion.

4. The method of claim 1 wherein computing said sample quantization distortion value comprises the step of dividing said aggregate allowable quantization distortion value by a number of samples in said frame of samples to form a first sample distortion value.

5. The method of claim 4 wherein selecting a set of samples comprises the step of:
   selecting a tentative set of samples of said digital signal wherein each sample of said tentative set is greater than a noise threshold determined at least in part by the value of said first sample distortion value, and wherein calculating said sample quantization distortion value comprises the step of:
   adjusting said first sample distortion value by an amount determined by the difference between said first sample distortion value and at least one sample excluded from said tentative set.

6. The method of claim 5 wherein selecting said tentative set of samples and adjusting said first sample distortion value comprise the steps of:
   a. identifying any noisy samples of said tentative set, each said noisy sample having a magnitude below a current value of said first sample distortion value,
   b. removing said noisy samples, if any, from said tentative set,
   c. if any noisy samples are removed, increasing said first sample distortion value by an amount determined by the difference between said first sample distortion value and at least one said noisy sample, and
   repeating steps a, b and c until an adjusted first sample distortion value is reached for which step a identifies no additional noisy samples of said tentative set which are greater than said adjusted first sample distortion.

7. The method of claim 6 further comprising the step of terminating said adjustment if said steps a, b and c have been repeated a maximum number of times.

8. The method of claim 7 further comprising the steps of:
   after said adjustment is terminated, estimating the number of bits required to transmit all samples of said tentative set,
   comparing said estimated bit number to a maximum bit number, and
   if said estimated bit number is less than or equal to said maximum bit number, selecting a final noise threshold based on said adjusted first sample distortion value.

9. The method of claim 8 wherein if said estimated bit number exceeds said maximum bit number, the method further comprises the steps of:
   preparing a second sample distortion value,
   (d) selecting a second tentative set of samples of said digital signal, each of a plurality of said samples of said second tentative set having a magnitude above said second sample distortion value, (e) estimating the number of bits required to transmit all samples of said second tentative set, (f) comparing said estimated bit number to said maximum bit number, and (g) if said estimated bit number is greater than said maximum bit number, increasing said second sample distortion value by an amount determined by said selection.

10. The method of claim 9 further comprising the step of repeating steps d-g until a second sample distortion value is reached for which step g determines that said estimated bit number is less than or equal to said maximum bit number.

11. The method of claim 10 further comprising the steps of:

calculating said sample distortion value from said adjusted first sample distortion value and said second sample distortion value and, selecting a final set of samples of said digital signal, each of a plurality of said samples of said final set having a magnitude above a final threshold determined by the sample's corresponding sample distortion value.

12. An encoding device for allocating a variable number of transmission bits on a frame-by-frame basis for use in transmitting samples of a digital signal, the encoding device comprising:

means for selecting an aggregate allowable quantization distortion value representing a collective allowable quantization distortion error for a frame of samples of said digital signal, means for selecting from said frame of samples, a set of samples wherein each of a plurality of samples of said set is greater than a noise threshold, means for computing, for each sample of said set, a sample quantization distortion value representing an allowable quantization distortion error for said sample, wherein a sum of all sample quantization distortion values for all samples of said set approximately equal to said aggregate allowable quantization distortion value, means for selecting, for each sample of said set, a quantization step size which yields a quantization distortion error approximately equal to said sample's corresponding quantization distortion value, and means for quantizing said sample using said quantization step size.

13. The encoding device of claim 12 wherein said means for selecting a quantization step size comprises means for calculating a quantization step size for each sample to be transmitted based, at least in part, on the difference between said sample and said sample's corresponding quantization distortion value.

14. The encoding device of claim 12 wherein said digital signal includes a noise component and a signal component, and wherein said means for selecting an aggregate allowable quantization distortion comprises:

means for preparing a signal index representing, for at least one sample of said frame, the magnitude of said signal component relative to the magnitude of said noise component, and means for selecting said aggregate allowable quantization distortion, based on said signal index.

15. The encoding device of claim 12 wherein said means for computing said sample quantization distortion value comprises means for dividing said aggregate allowable quantization distortion value by a number of samples in said frame of samples to form a first sample distortion value.

16. The encoding device of claim 15 wherein said means for selecting a set of samples comprises:

means for selecting a tentative set of samples of said digital signal wherein each sample of said tentative set is greater than a noise threshold determined at least in part by the value of said first sample distortion value, and wherein said means for computing said sample quantization distortion value comprises:

means for adjusting said first sample distortion value by an amount determined by the difference between said first sample distortion value and at least one sample excluded from said tentative set.

17. The encoding device of claim 16 wherein said means for selecting said tentative set of samples and said means for adjusting said first sample distortion value comprise:

means for identifying any noisy samples of said tentative set, each said noisy sample having a magnitude below a current value of said first sample distortion value, means for removing said noisy samples, if any, from said tentative set, means for increasing said first sample distortion value by an amount determined by the difference between said first sample distortion value and at least one said noisy sample, if any noisy samples are removed, and means for repeatedly removing noisy samples and adjusting said first sample distortion value until an adjusted first sample distortion value is reached for which no additional noisy samples of said tentative set are greater than said adjusted first sample distortion.

18. The encoding device of claim 17 further comprising means for terminating said adjustment if said first sample distortion value is adjusted a maximum number of times.

19. The encoding device of claim 18 further comprising:

means for estimating after said adjustment is terminated, the number of bits required to transmit all samples of said tentative set, means for comparing said estimated bit number to a maximum bit number, and means for selecting a final noise threshold based on said adjusted first sample distortion value, if said estimated bit number is less than or equal to said maximum bit number.

20. The encoding device of claim 19 wherein the encoding device further comprises:

means for preparing a second sample distortion value, if said estimated bit number exceeds said maximum bit number, means for selecting a second tentative set of samples of said digital signal, each of a plurality of said samples of said second tentative set having a magnitude above said second sample distortion value, means for estimating the number of bits required to transmit all samples of said second tentative set, means for comparing said estimated bit number to said maximum bit number, and means for increasing said second sample distortion value by an amount determined by said selection, if said estimated bit number is greater than said maximum bit number.

21. The encoding device of claim 20 further comprising means for repeatedly adjusting said second sample distortion value, reselecting said second tentative set of samples, and estimating the number of bits required to transmit all samples of said second tentative set until a second sample distortion value is reached for which said estimated bit number is less than or equal to said maximum bit number.

22. The encoding device of claim 21 further comprising:
means for calculating said sample distortion value from said adjusted first sample distortion value and said second sample distortion value and,
means for selecting a final set of samples of said digital signal, each of a plurality of said samples of said final set having a magnitude above a final threshold determined by the sample's corresponding sample distortion value.

* * * * *

UNITED STATES PATENT AND TRADEMARK OFFICE
CERTIFICATE OF CORRECTION

PATENT NO. : 5,317,672
DATED : May 31, 1994
INVENTOR(S) : Antony H. Crossman, Edmund S. Thompson It is certified that error appears in the above-indentified patent and that said Letters Patent is hereby corrected as shown below:

Cover page, at [73] Assignee, "Picturetel" should be --PictureTel--.

Col. 12, lines 2-3, "(Steps 322)" should be --(Step 322)--.

Col. 13, first equation, --(15)-- is missing.

Col. 13, lines 28 and 31, "huffman" should be --Huffman--.

Col. 13, line 46, equation (18), "C'" should be --c'--.

Col. 14, line 57, "l(k)" should be --I(k)--.

Col. 15, line 13, "(i)" should be --(j)--.

Col. 16, line 46, "," should be --.--.

Col. 16, line 48, "show" should be --shown--.

UNITED STATES PATENT AND TRADEMARK OFFICE
CERTIFICATE OF CORRECTION

PATENT NO. : 5,317,672
DATED : May 31, 1994
INVENTOR(S) : Antony H. Crossman, Edmund S. Thompson It is certified that error appears in the above-indentified patent and that said Letters Patent is hereby corrected as shown below:

Col. 16,, lines 62-63, after "corresponding" delete "responding" (second occurrence).

Col. 17, second equation, --(24)-- is missing.

Col. 19, line 41, after "set" insert --is--.

Signed and Sealed this

Third Day of September, 1996

Attest:

BRUCE LEHMAN

Attesting Officer    Commissioner of Patents and Trademarks